(12) United States Patent
Telefus

(10) Patent No.: US 6,381,150 B2
(45) Date of Patent: *Apr. 30, 2002

(54) ISOLATED DUAL CONVERTER HAVING PRIMARY SIDE INTERNAL FEEDBACK FOR OUTPUT REGULATION

(75) Inventor: Mark D. Telefus, Orinda, CA (US)

(73) Assignee: IWATT, Campbell, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/444,032

(22) Filed: Nov. 19, 1999

(51) Int. Cl.⁷ .................. H02M 3/00; H02M 3/335; H02M 3/22
(52) U.S. Cl. .................. 363/15; 363/24; 363/26; 363/41
(58) Field of Search .................. 363/15, 16, 24, 363/25, 26, 40, 41, 131

(56) References Cited

U.S. PATENT DOCUMENTS

| | | | | |
|---|---|---|---|---|
| 3,781,505 A | * | 12/1973 | Steigerwald | 219/10.49 |
| 3,820,005 A | * | 6/1974 | Steigerwald | 321/18 |
| 4,251,857 A | | 2/1981 | Shelly | 363/26 |
| 4,533,986 A | | 8/1985 | Jones | 363/17 |
| 4,796,173 A | | 1/1989 | Steigerwald | 363/25 |
| 4,860,184 A | * | 8/1989 | Tabisz et al. | 363/17 |
| 5,038,264 A | | 8/1991 | Steigerwald | 363/21 |
| 5,283,727 A | * | 2/1994 | Kheraluwala et al. | 363/98 |
| 5,317,496 A | | 5/1994 | Seiersen | 363/24 |
| 5,402,329 A | | 3/1995 | Wittenbreder, Jr. | 363/16 |
| 5,432,695 A | * | 7/1995 | Vlatkovic et al. | 363/138 |
| 5,434,767 A | | 7/1995 | Batarseh et al. | 363/16 |
| 5,434,768 A | * | 7/1995 | Jitaru et al. | 363/21 |
| 5,438,498 A | * | 8/1995 | Ingemi | 363/17 |
| 5,475,579 A | * | 12/1995 | John et al. | 363/21 |
| 5,546,294 A | * | 8/1996 | Schutten et al. | 363/17 |

(List continued on next page.)

FOREIGN PATENT DOCUMENTS

| | | | | |
|---|---|---|---|---|
| EP | 0 944 162 A1 | 3/1998 | | H02M/3/337 |
| WO | WO 88/09084 | 11/1988 | | H02M/3/337 |

OTHER PUBLICATIONS

Jordan, M., O'Connor, John A., "Resonant Fluorescent Lamp Converter Provides Efficient and Compact Solution," Proceedings of the Annual Applied Power Electronics Conference and Exposition (APEC), US, New York, IEEE, vol. Conf. 8, Mar. 7, 1993, pp. 424–431, XP000357925, ISBN: 0-7803-0983-9.

*Primary Examiner*—Bao Q. Vu
(74) *Attorney, Agent, or Firm*—Lyon & Lyon LLP

(57) ABSTRACT

The present invention comprises an isolated dual power supply having an internal feedback loop. The dual power supply comprises a modulated switched power converter generating an internal regulated voltage output coupled to an alternating current tank. The alternating current tank has a first and a second power switch that are alternately switched ON at a 50% duty cycle. When the first switch is ON, the internal regulated voltage output is coupled to a storage capacitor and a primary winding of a transformer in the alternating current tank wherein the storage capacitor is charged and a current flows in a first direction through the primary winding. Alternatively, when the second switch is ON, the charged storage capacitor discharges and a current flows in a second direction opposite to the first direction through the primary winding. In this fashion, the transformer becomes a linear device, allowing the use of internal feedback to control the external output of the transformer.

40 Claims, 11 Drawing Sheets

U.S. PATENT DOCUMENTS

| | | | | |
|---|---|---|---|---|
| 5,572,418 A | * | 11/1996 | Kimura et al. | 363/97 |
| 5,621,627 A | | 4/1997 | Krawchuk et al. | 363/37 |
| 5,642,273 A | | 6/1997 | Lai et al. | 363/56 |
| 5,694,007 A | * | 12/1997 | Chen | 315/247 |
| 5,694,304 A | | 12/1997 | Telefus et al. | 363/21 |
| 5,701,243 A | * | 12/1997 | Youn et al. | 363/89 |
| 5,712,771 A | | 1/1998 | Fitter et al. | 363/17 |
| 5,712,772 A | | 1/1998 | Telefus et al. | 363/21 |
| 5,717,772 A | * | 2/1998 | Telefus et al. | 363/21 |
| 5,774,347 A | * | 6/1998 | Nakanishi | 363/21 |
| 5,815,386 A | * | 9/1998 | Gordon | 363/50 |
| 5,856,919 A | | 1/1999 | Moriarty et al. | 363/101 |
| 5,870,298 A | * | 2/1999 | Hung | 363/98 |
| 5,946,203 A | | 8/1999 | Jiang et al. | 363/46 |
| 5,946,206 A | * | 8/1999 | Shimizu et al. | 363/65 |
| 5,982,644 A | | 11/1999 | Hulsey et al. | 363/26 |
| 5,986,895 A | * | 11/1999 | Stewart et al. | 363/16 |
| 5,999,417 A | | 12/1999 | Schlecht | 363/16 |
| 5,999,433 A | * | 12/1999 | Hua et al. | 363/132 |
| 6,008,589 A | | 12/1999 | Deng et al. | 315/209 R |
| 6,069,801 A | * | 5/2000 | Hodge, Jr. et al. | 363/21 |

* cited by examiner

US 6,381,150 B2

ISOLATED DUAL CONVERTER HAVING PRIMARY SIDE INTERNAL FEEDBACK FOR OUTPUT REGULATION

This invention pertains generally to the field of power conversion and more particularly to a pulse width modulated switching power supply with linear feedback control.

BACKGROUND OF THE INVENTION

Compact and efficient power supplies are an increasing concern to users and manufacturers of electronics. Pulse width modulated (PWM) switching power supplies offer both compactness and efficiency in a number of different topologies. Boost and buck PWM switching power supply topologies are efficient, but do not isolate the power input from the power output. Other topologies, such as the flyback, do isolate the power input from the power output by using a transformer. In such topologies, however, feedback from the secondary (power output) side of the transformer is required to adjust the pulse width modulation of the power switch. To properly compensate the feedback from the secondary requires extra components and often involves expensive re-design, depending upon the particular application.

In contrast to a PWM switching power supply, soft-switched converters possess resonant elements to generate sinusoidally varying resonant voltages and/or currents that help reduce switching losses. Notably, in a particular form of soft-switched converter, a resonant transition converter, LC elements coupled to two power switches that turn on and off only at either zero current states or zero voltage states during a sinusoidally varying resonant current or voltage waveform minimizes switching stress and loss. In general, the behavior of these resonant waveforms depends on the values of the inductance and capacitance within the resonant tank as well as values of the DC input and output voltages. Accordingly, considerable research has been conducted on the relationship between these values and the resonant waveforms. Researchers have discovered that to maintain a constant output voltage independent of the output current from such series or parallel resonant converters requires, for example, frequency modulation of the switching elements within the resonant converters. See, e.g., U.S. Pat. Nos. 4,796,173, 5,448466, 4,017,784, 4,727,469, and 4,757,432. However, because of the nonlinear loading within a resonant tank, analysis and design of the feedback control systems for these converters is difficult and cumbersome.

There is a need in the art for an improved PWM switching power supply that combines the simplicity and ease of design provided by a PWM switching power supply yet provides the stress and loss advantages of a resonant converter without requiring adjustment, such as through frequency modulation, of the properties of the resonant converter. Further, there is a need in the art for a PWM switching power supply that isolates the input and outputs through a transformer without requiring feedback from the secondary side of the transformer, thereby easing design and reducing the component count. In addition, there is a need in the art for an improved resonant converter and methods of controlling such converters that avoid the complexity of prior art methods involving frequency control, magnetic flux control, or impedance adjustment of resonant converters. The present invention addresses these needs by providing, in one embodiment, a resonant converter whose output is regulated by a DC input voltage that is in turn is adjusted accordingly by the output current or voltage status.

SUMMARY OF THE INVENTION

In accordance with one aspect of the present invention, a power converter comprising a PWM switching power supply coupled to an alternating current tank is provided. The PWM switching boost power supply includes a power switch for regulating an internal voltage output. The alternating current tank comprises a first and a second switch, control circuitry for controlling the first and second switches, a transformer having a primary winding and a secondary winding, and a storage capacitor. The control circuitry alternatively switches the first switch ON when the second switch is OFF and switches the second switch ON when the first resonant switch is OFF, wherein the control circuitry alternatively switches the first and second resonant switches such that the ON and OFF times of each switch are substantially equal. When the first switch is ON, the storage capacitor is coupled to the internal voltage output such that the storage capacitor is charged and a current flows in a first direction through the primary winding. Alternatively, when the second switch is ON, the charged storage capacitor discharges such that a current flows in a second direction, opposite to the first direction, through the primary winding.

Because the ON and OFF times of the first and second switches are substantially equal, an output voltage produced by the secondary winding is linearly related to the internal output voltage and the current through the primary. By sensing the current through the primary and adjusting a duty cycle of the power switch accordingly, the present invention regulates the output voltage without the need for a feedback loop from the isolated secondary. In addition, the duty cycle of the power switch may be adjusted in response to directly sensing the internal output voltage through a voltage divider or the like.

In accordance with another aspect of the invention, the PWM switching power supply may be a boost converter, a buck converter, or a buck/boost converter. The storage capacitor of the alternating current tank may be a resonant capacitor either in series or in parallel with a leakage inductance of the primary, forming a series resonant tank or a parallel resonant tank, respectively.

In accordance with a still further aspect of the invention, a power converter comprising a modulated switching power supply having a power switch for regulating an internal voltage output coupled to a plurality of alternating current tanks is provided. The storage capacitor in each of the alternating current tanks may be a resonant capacitor either in series or parallel with a leakage inductance of the primary winding, forming a series resonant tank or a parallel resonant tank, respectively, as described herein. A clock coupled to the plurality of alternating current tanks permits the first and second switches to be switched synchronously with each other. The output voltage from each secondary winding is combined in parallel for application to a load. An intelligent switch may be coupled between the modulated switching power supply and the plurality of alternating current tanks wherein a given alternating current tank is coupled to the internal voltage output through the intelligent switch only when required to support a required voltage across the load.

In accordance with a still further aspect of the present invention, methods of generating DC or AC power are provided. In one embodiment, the method comprises generating an internal regulated voltage output using a modulated switching power supply. The internal regulated voltage output is coupled to a storage capacitor and a primary winding of a transformer wherein the storage capacitor is charged and a first current flows in a first direction through the primary winding during a first period. The internal regulated voltage output is then decoupled from the storage capacitor and the primary winding wherein the charged storage capacitor discharges and a second current flows in a second direction opposite the first direction through the primary winding during a second period, the first period being equal to the second period.

Other aspects and advantages of the present invention are disclosed by the following description and figures.

DESCRIPTION OF FIGURES

The various aspects and features of the present invention may be better understood by examining the following figures.

DETAILED DESCRIPTION

Figure 1:
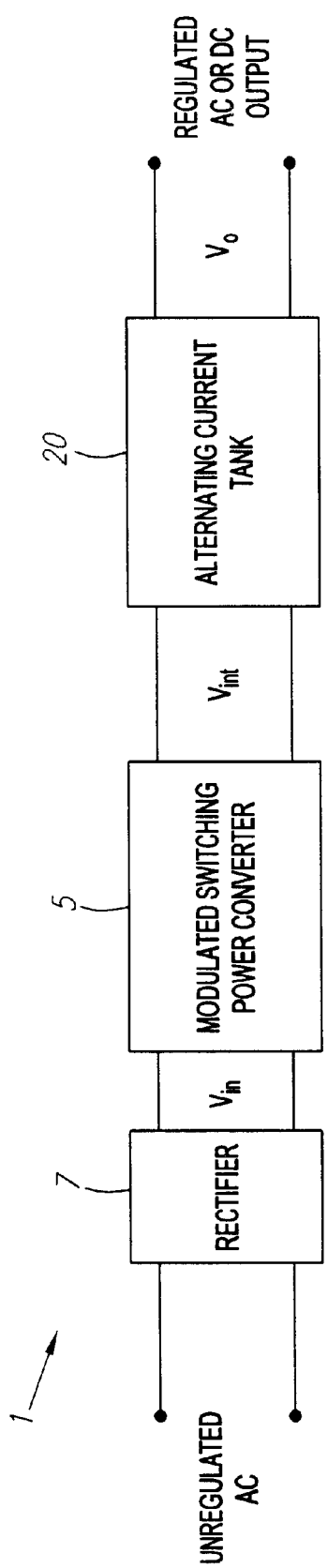
FIG. 1 illustrates a modulated switching power supply coupled to an alternating current tank according to one embodiment of the invention.

Turning now to FIG. 1, one embodiment of the power converter 1 of the present invention is illustrated. In this embodiment, a modulated switching power converter 5 couples to an alternating current tank 20. Because of these two stages, the resulting power converter 1 has a "dual converter" topology. The power converter 1 receives an unregulated DC voltage input, $V_{in}$, which may be generated by a rectifier 7 operating on an unregulated AC input, to generate a regulated AC or DC output voltage, $V_O$.

Within the power converter 1, the modulated switching power converter 5 receives the unregulated DC input voltage, $V_{in}$, and produces an internal regulated voltage output, $V_{int}$. Because this regulated voltage output $V_{int}$ is internal to the power converter 1, it may be considered "preregulated" as compared to the regulated output voltage, $V_O$. As used herein, a "modulated" switching power converter may include any suitable form known in the art, for example, a pulse width modulated (PWM) switched power converter. Because PWM switching power converters have desirable output ripple and noise properties, they will be illustrated in the following embodiments of the invention. That is not to imply, however, that other types of modulated switching power converters such as frequency modulated switching power converters could not be used to generate the internal regulated voltage output.

Figure 3:
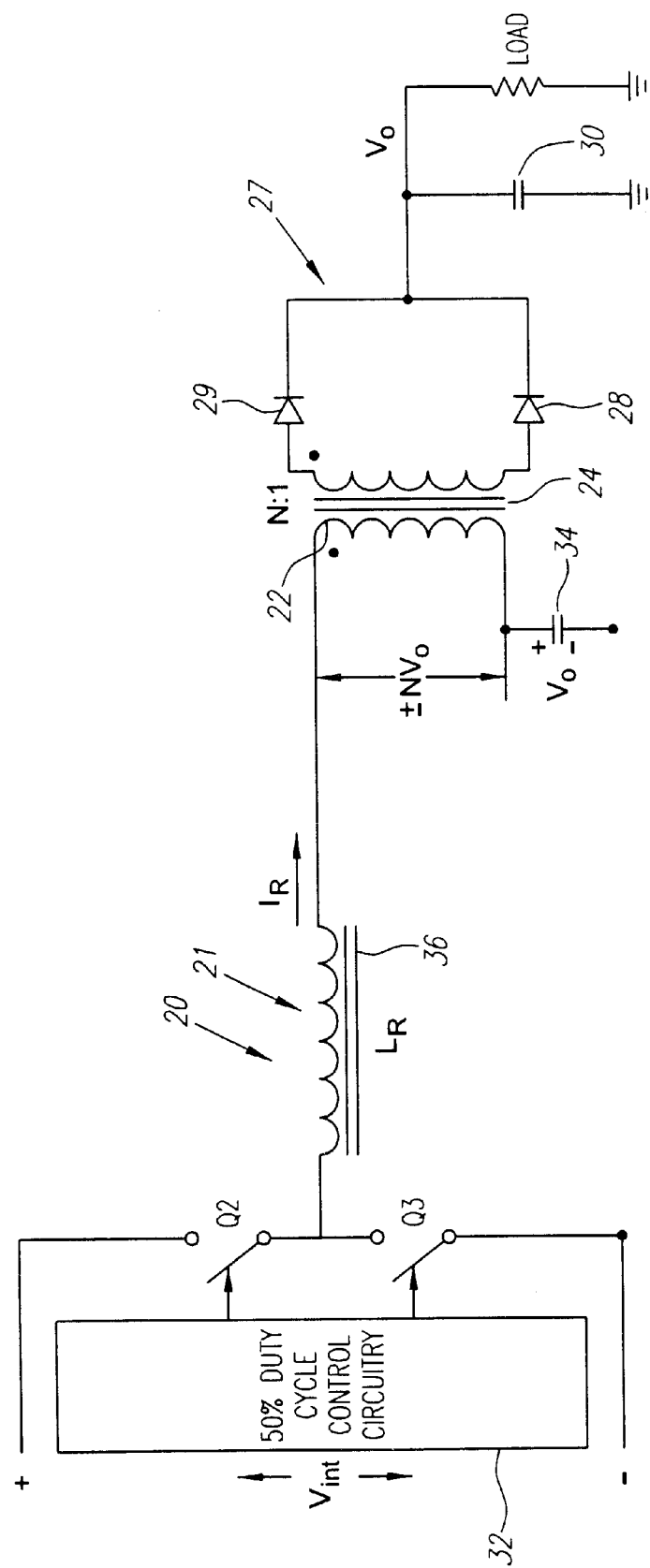
FIG. 3 is illustrates an alternating current tank in a series resonant tank configuration according to one embodiment of the invention.

An alternating current tank 20 couples to $V_{int}$ to generate an isolated voltage output, $V_O$, through a transformer (illustrated in FIG. 3). As will be described herein, because the of the unique configuration of the alternating current tank 20, the transformer becomes a linear device, permitting the use of a strictly internal feedback loop within the alternating current tank 20, if desired.

Figure 2:
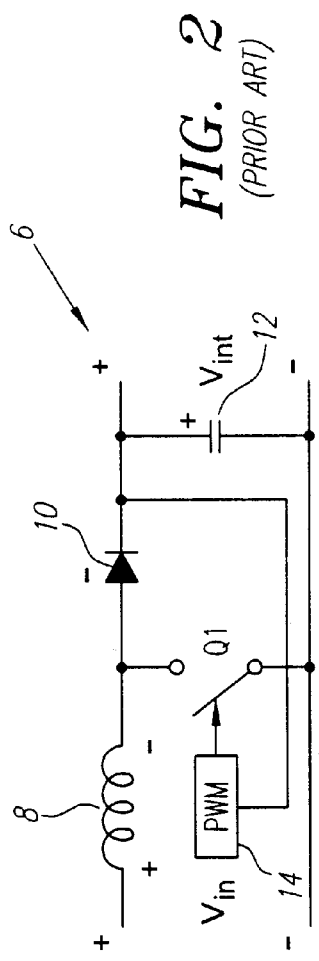
FIG. 2 illustrates a prior art PWM boost power converter.

The modulated switching power converter 5 may be of any type known in the art such as a boost, buck, buck/boost, flyback, half-bridge, forward, push-pull, or full-bridge switching power converter. Turning now to FIG. 2, a boost converter 6 is illustrated. The boost converter 6 comprises a power switch Q1 (typically a field effect transistor (FET)) coupled to a boost inductor 8, a boost diode 10, and a storage capacitor 12. A pulse width modulator 14 adjusts a duty cycle of the power switch Q1 in response to sensing an internal output voltage, $V_{int}$. The relationship between the input voltage, $V_{in}$, and $V_{int}$ may be approximated as $$V_{int}=V_{in}*(T/t_{off})$$

where T is the switching period and $t_{off}$ is the off time of the power switch Q1. Inspection of FIG. 2 reveals that the ground of $V_{int}$ is not isolated from that of $V_{in}$.

Referring now to FIG. 3, in the present invention, an alternating current tank 20 couples to $V_{int}$ to generate an output voltage that is isolated from $V_{in}$. The alternating current tank 20 includes a storage capacitor 34 that is either in series or in parallel with the primary winding 22 of a transformer 24. A first and a second switch (illustrated here as switches Q2 and Q3, respectively) couple to the primary winding 22 and storage capacitor 34. As will be further explained, the alternating current tank 20 generates an alternating current through the primary winding 22 by switching switches Q2 and Q3 ON and OFF at a 50% duty cycle. The alternating current (AC) thus induced through the secondary winding 26 may be rectified or used as AC. In the embodiment of the alternating current tank illustrated in FIG. 3, a rectifier 27 on the secondary side of the transformer rectifies the current through the load. The rectifier 27 may be either a full-wave or half-wave rectifier as is known in the art. In one embodiment, the rectifier 27 comprises a center tapped secondary winding 26 coupled to diodes 29 and 28 and output capacitor 30 to form a full wave rectifier such that current is unidirectional through the load.

As will be described herein, the alternating current tank 20 may be in either a series resonant tank or a parallel resonant tank configuration. Such configurations have the storage capacitor 34 and the primary winding 22 in series or parallel, respectively, as described above. However, in such configurations, the value of a capacitance of the storage capacitor 34, a leakage inductance 36 of the primary winding 22, and the period of the 50% duty cycle used to operate switches Q2 and Q3 are such that resonant waveforms are generated. Because these configurations permit zero-transition switching of switches Q2 and Q3, which reduces stress and loss, they will be described with respect to the series and parallel embodiments of the alternating current tanks described herein. That is not to imply, however, that a non-resonant alternating current tank 20 is not included within the scope of the invention.

The operation of the alternating current tank 20 of FIG. 3 in a series resonant tank configuration occurs as follows. 50% duty cycle control circuitry 32 controls a first resonant switch Q2 and a second resonant switch Q3 such that when Q2 is ON, Q3 is OFF. Conversely, control circuitry 32 turns Q2 OFF when Q3 is ON. When Q2 is on, the internal output voltage is coupled to the series-connected storage capacitor 34 and primary winding 22, thereby charging the storage capacitor 34 and inducing a half-wave quasi-sinusoidal current in a first direction through the primary winding 22 and the resonant tank circuit formed by the storage capacitor 34 and the leakage inductance 36 of the primary winding (represented separately from the primary winding for illustration purposes). Conversely, when Q3 is on, series-connected storage capacitor 34 and the primary winding 22 are uncoupled from the internal voltage output such that the charged storage capacitor 34 discharges and a half-wave quasi-sinusoidal current is induced in a second direction, opposite to that of the first direction, through the primary winding 22 and the resonant tank circuit formed by the storage capacitor 34 and the linkage inductance 36.

Figure 4:
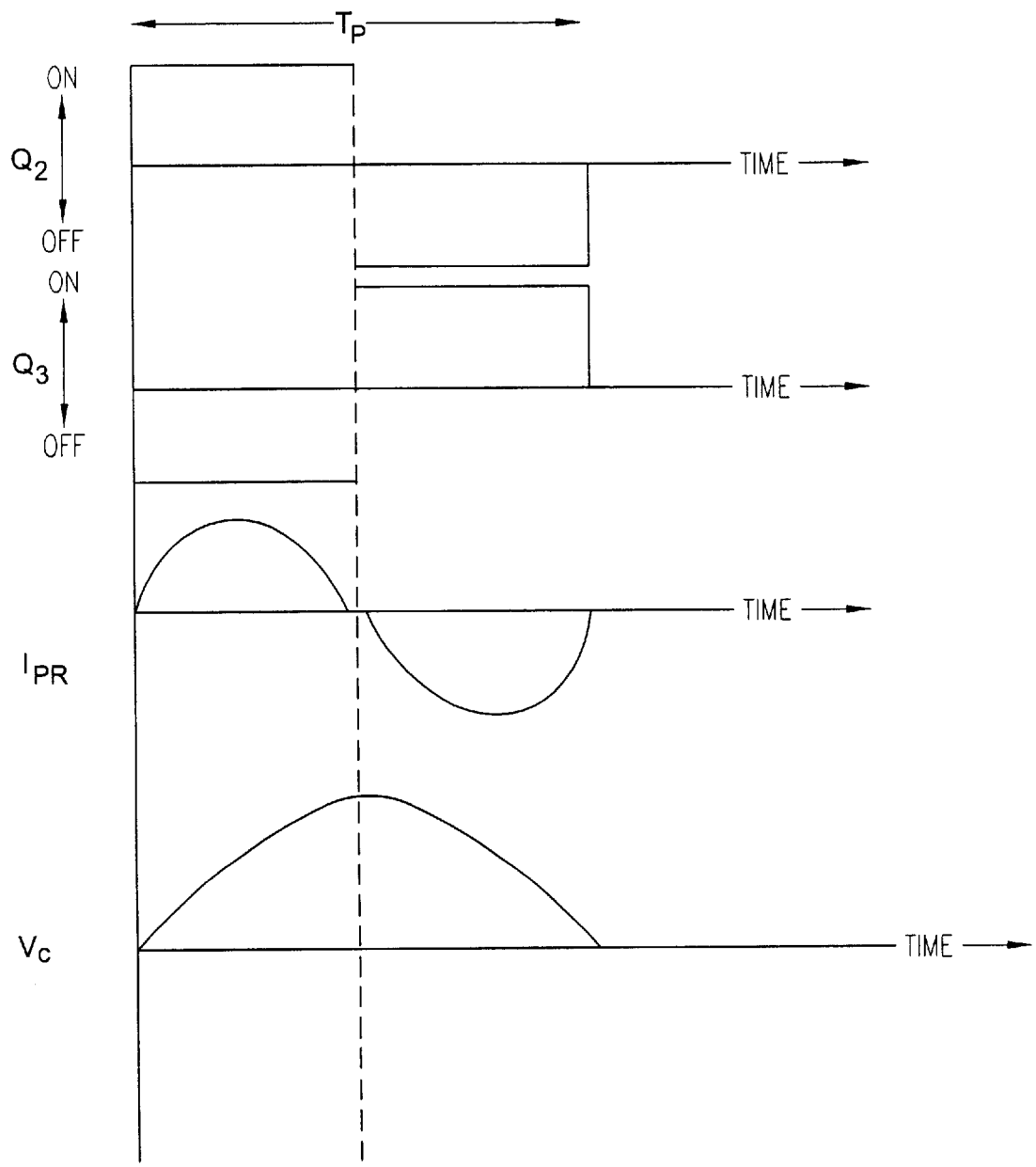
FIG. 4 is a graphical representation of the switch signals and the quasi-sinusoidal resonant currents in the circuit of FIG. 3.

The control circuitry 32 operates the resonant switches Q2 and Q3 at substantially a 50% duty cycle such that the ON time equals the OFF time of each resonant switch. Referring now to FIG. 4, the relationship between the ON and OFF times of Q2 and Q3, the full-wave quasi-sinusoidal current induced in the primary winding 22, $I_{PR}$, and the voltage, Vc, across the storage capacitor 34 is illustrated. As can be seen from inspection of FIG. 4, the resonant switches Q2 and Q3 are turned ON and OFF when the current $I_{PR}$ is zero, hence the denotation of a "zero-current" resonant converter. In this fashion, switching losses are minimized. Moreover, because the ON and OFF times of each resonant switch are equal, the primary winding 22 is effective excited by a full-wave sinusoidal current. During the time Q2 is ON, the voltage, Vc, across the storage capacitor charges to a maximum value. During the time Q3 is ON, the voltage $V_C$ discharges to zero. Note that there will be ordinarily some dead time (not illustrated) wherein Q2 has turned OFF but Q3 has not yet turned ON. In addition, the resonant frequency of the series resonant tank formed by the storage capacitor and the leakage inductance of the primary winding must be chosen such that the half-wave sinusoidal current waveform can be completed during the time when the resonant switches are ON. Thus, the current $I_{PR}$ is not a true full-wave sinusoid but rather a full-wave quasi-sinusoid. Nevertheless, the departure of $I_{PR}$ from a true sinusoidal wave is minimal.

The period $T_p$ of the 50% duty cycle for each of the switches Q2 and Q3 is controlled the control circuitry 32. In one embodiment, control circuitry 32 may comprise a high voltage half bridge driver with oscillator, model L6571A or L6571B from SGS-Thomson Microelectronics. The period $T_p$ determined by the control circuitry must be related to the period of the quasi-sinusoidal resonant current. As can be seen from inspection of FIG. 4, $T_p$ must be greater than the period of the quasi-sinusoidal resonant current ($I_{PR}$) of the series resonant tank circuit formed by the linkage inductance 36 and the storage capacitor 34 so that each half cycle of the resonant current may finish during the ON time of its corresponding switch Q2 or Q3. For example, during the time Q2 is ON, $I_{PR}$ must cycle from zero, through a maximum, and back to zero again. If the resonant frequency $f_r$ of the tank circuit was too slow, the quasi-sinusoidal resonant current $I_{PR}$ would not be able to finish a half cycle during this time.

Consider the following example. If $T_p$ is set at 20 $\mu$s, then each half period (i.e., the time Q2 or Q3 is ON) is 10 $\mu$s. Thus, to assure completion of a half wave of the resonant current $I_{PR}$, the resonant half period should be less than this time, for example 8 $\mu$s. Such a half period gives a resonant frequency $f_r$ of 55.6 KHZ. For a series (and also a parallel) resonant tank circuit, the resonant frequency (in Hz) is given by $$f_r = 1/(2\pi * \mathrm{sqrt}(L_R C_R))$$

where $L_R$ is the value of the leakage inductance and $C_R$ is the value of the resonant capacitance. Inspection of this equation indicates that to increase the resonant frequency $f_r$, the value of the (in this case, resonant) storage capacitor $C_R$ should be minimized. This leads to a design choice, because the output power of the primary winding 22 may be approximated as $$P_{primary} = (C_R * V^2 * f_r)/2$$

where V is the voltage across the primary winding 22 and $P_{primary}$ is the output power of the primary winding 22. Note that the contribution to $P_{primary}$ from the leakage inductance may be neglected due because the leakage inductance is typically quite small compared to the mutual inductance of the primary winding. Thus, if the mutual inductance is a few milliH, the leakage inductance will be a few $\mu$H.

Inspection of the equation for $P_{primary}$ reveals that the output power is increased if the value of the resonant storage capacitor $C_R$ is increased. However, if the value of $C_R$ is increased too much, then $f_r$ will be too slow to allow the resonant current to complete a half cycle during the times when either Q2 or Q3 is ON. Thus, tradeoffs should be made between the switching period $T_p$, the resonant (storage) capacitance and the desired output power.

It may be shown that the voltage output of the full wave rectifier 27 of FIG. 3, $V_O$, is approximated by $$V_O = V_{int}/2N$$

where N is the turn ratio between the primary winding 22 and the secondary winding 26. It follows that the resonant current through the primary, $I_{PR}$, may be approximated by $$I_{PR} = (V - NV_O - (I_O * ESR/N))/Z_O;$$

$Z_O = \mathrm{sqrt}(L_R/C_R)$ where V is the voltage impressed across the series-connected resonant tank circuit formed by the storage capacitor 34 ($C_R$) and leakage inductance 36 ($L_R$) of the primary winding 22, $I_O$ is the current through the load, ESR is the equivalent series resistance seen by the secondary winding 26, and $Z_O$ is the impedance of the resonant tank circuit formed by the leakage impedance 36 ($L_R$) and the storage capacitor 34 ($C_R$). Thus, $I_{PR}$ will have a peak absolute value that is also linearly related to $V_{int}$. This demonstrates one of the advantages of the present invention—i.e., no external feedback is necessary from the secondary side 26 of the transformer 24. Instead, a single internal (primary side) feedback loop may be utilized because the peak values $I_{PR}$ are linearly related to the output voltage. Thus, the often onerous task of compensating feedback from the secondary side of the transformer may be eliminated.

Figure 5:
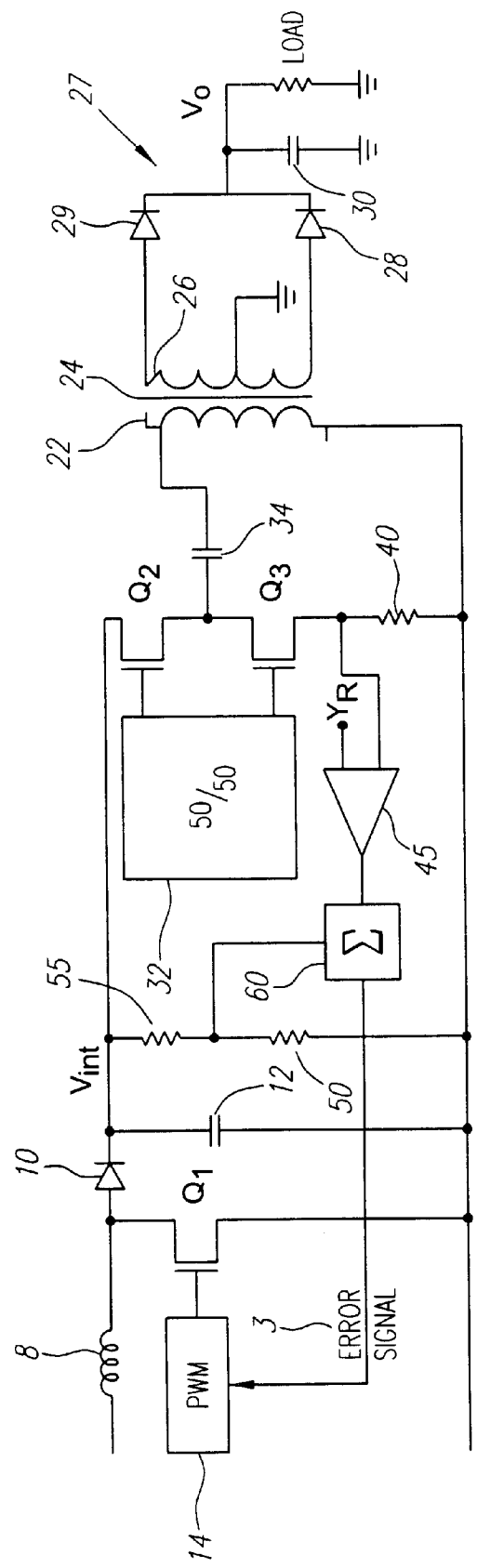
FIG. 5 is a schematic diagram of a power supply comprising a boost power converter coupled to an alternating current tank in a series resonant configuration according to one embodiment of the invention.

The internal feedback loop of the present invention wherein the PWM modulated switching power converter is a boost power converter and the alternating current tank is in a series resonant tank configuration may be implemented as shown in FIG. 5. In this embodiment of the invention, the peak current through the primary winding, $I_{peak}$ is sensed by coupling the voltage across the sense resistor 40 to an error amplifier 45. The switches Q1, Q2, and Q3 are implemented through semiconductor FET transistors. Note that in an alternate embodiment, the sense resistor 40 could have been placed in series with the primary winding 22, such that $I_{peak}$ could be sensed in each half cycle of the quasi-sinusoidal current flowing through the primary winding 22. In such an embodiment, however, the sensed voltage would be bipolar, alternating in polarity with each half cycle. To use a conventional error amplifier 45 with this bipolar signal would require rectification. Thus, it is preferred to sense $I_{peak}$ only in the half cycle when switch Q3 is ON by placing the sense resistor in series with switch Q3.

The voltage across the sensing resistor 40 is coupled to the differential amplifier 45 (error amplifier) where it is compared to a reference voltage $V_R$ and produces an error signal for inputting to the pulse width modulator 14. In one embodiment, the pulse width modulator 14 would receive only this error signal to control the output voltage $V_O$ across the load, or equivalently, the current through the load. Such embodiments would thus have only a current feedback control loop. This is sufficient because of the linear relationship between $I_{peak}$ and $V_O$. However, as illustrated in the prior boost converter of FIG. 2, the pulse width modulation may also be varied by directly sensing the internal voltage output $V_{int}$, thereby providing a voltage feedback control loop. Thus, in the embodiment of FIG. 5, $V_{int}$ is sensed through the voltage divider formed by resistors 50 and 55. The sensed internal voltage and the error signal from the differential amplifier 45 are summed in summing circuit 60 and the combined signal forms the input for the pulse width modulator 14. Notably, both voltage and current feedback are used in the internal feedback loop of FIG. 5: $I_{peak}$ from the primary and the sensed voltage from $V_{int}$. Such an arrangement provides an advantageous degree of control over the output voltage $V_O$. However, either form of feedback may be used alone. Thus, the pulse width modulator could be responsive only to the sensed internal voltage as in the prior art boost converter of FIG. 2.

As can be seen from the equation for the primary current, $I_{PR}$, given herein, the effects of load losses are reflected in the value of $I_{PR}$ through the ($I_O$*ESR/N) term. Thus, sensing the primary current and adjusting the PWM accordingly does provide load compensation. In the circuit of FIG. 5, load compensation will not occur unless rises above $V_R$. Prior to this point, the internal voltage output, $V_{int}$, is controlled by the voltage feedback provided through the voltage divider formed by resistors 55 and 50. When $I_{PR}$ rises such that $V_R$ is exceeded across the sensing resistor 40, the differential amplifier 45 will produce an output signal. This signal will dominate over that produced by the voltage divider such that the PWM modulator 14 is adjusted largely by just the current feedback.

Moreover, the present invention does not exclude the use of an external feedback loop coupled through the use of optoisolators, or other isolation means, as implemented in conventional flyback converters and the like. Indeed, an embodiment of the present invention may have solely an external feedback loop as is known in the art and still possess advantageous properties because of the efficiencies inherent when an alternating current tank couples to a PWM switched converter. Regardless of the type of feedback, the characteristics of the resonant tank circuit within the alternating current tank 20 remains constant: no adjustment in the switching speed of Q2 and Q3 need be made. Thus, unlike prior art resonant converters, power factor correction and regulation of the alternating current tank 20 is controlled through adjusting the PWM of the switching power supply 5, not by internal adjustments of the resonant tank.

Figure 6:
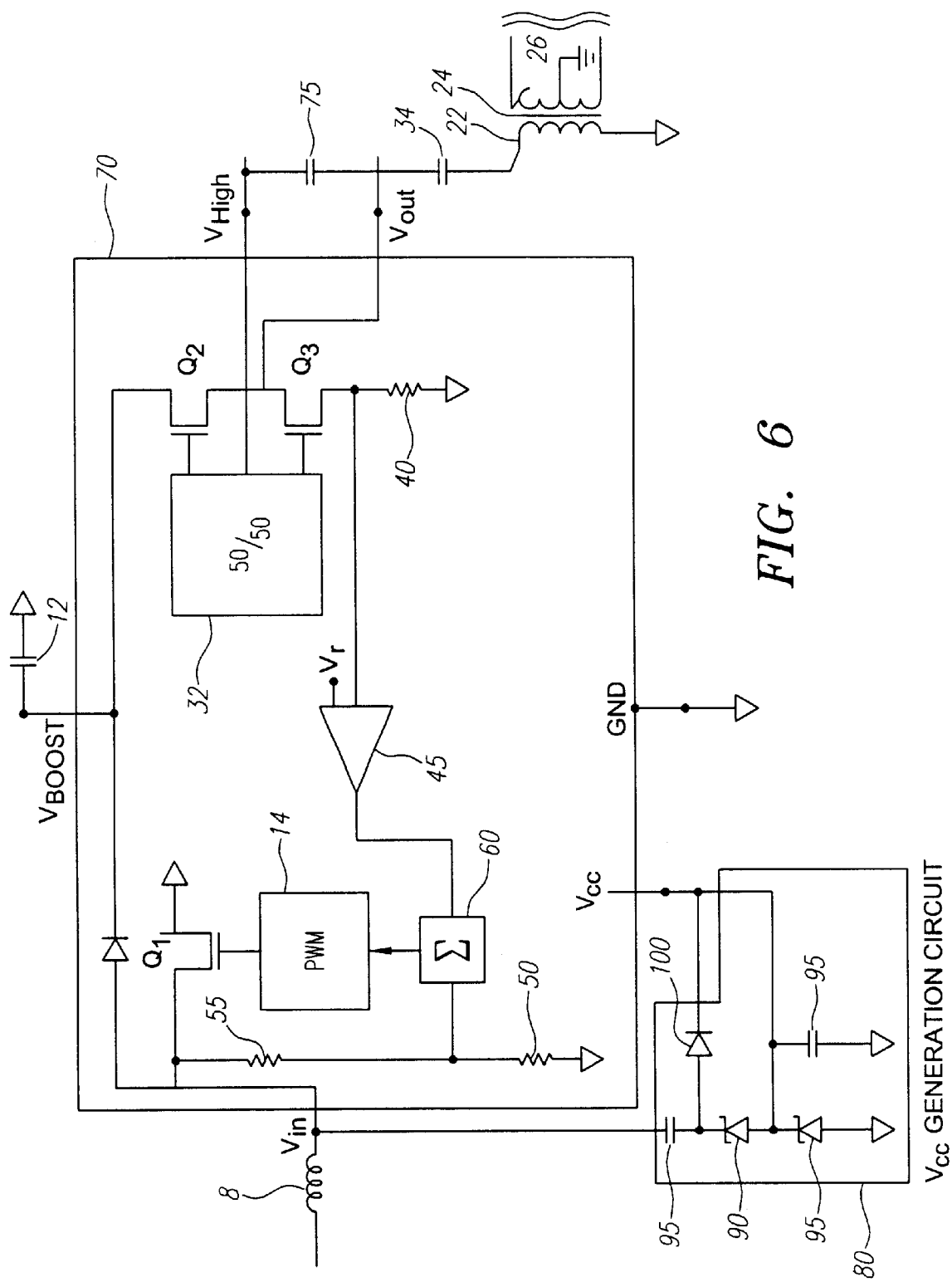
FIG. 6 is a schematic diagram of the power supply of FIG. 5, wherein portions of the power supply are incorporated into an integrated circuit.

Portions of the circuit of FIG. 5 may be packaged into a single integrated circuit. Turning now to FIG. 6, in one embodiment of the invention, an integrated circuit 70 having six leads is illustrated. Contained within integrated circuit 70 are the boost converter diode 10, the three switching transistors Q1, Q2, and Q3, the pulse width modulator 14, the control circuitry 32, the error amplifier 45, the summer 60, the sensing resistor 40, and the voltage divider formed by resistors 55 and 50 all coupled as described with respect to FIG. 5. Components that are difficult to construct on a semiconductor substrate may be located externally to the integrated circuit 70.

The boost inductor 8 is external to th e circuit 70 and couples to a Vin lead. The boost diode 10 couples to the external boost capacitor 12 through a Vboost lead. A Vout lead allows the resonant switches Q2 and Q3 to couple the resonant current $I_{PR}$ to the externally located storage capacitor 34 and transformer 24. The transformer 24 has a primary winding 22 and secondary winding 24, as discussed with respect to FIGS. 2 and 5. It is to be noted that resonant switch Q2 couples to the high internal voltage within the integrated circuit 70. Thus, a high voltage capacitor 75 coupled to $V_{out}$ and to the control circuitry 32 through a lead Vhigh allows the control circuitry to efficiently switch on the resonant switch Q2. A $V_{cc}$ lead and a ground lead (Gnd) complete the integrated circuit 70.

Figure 5A:
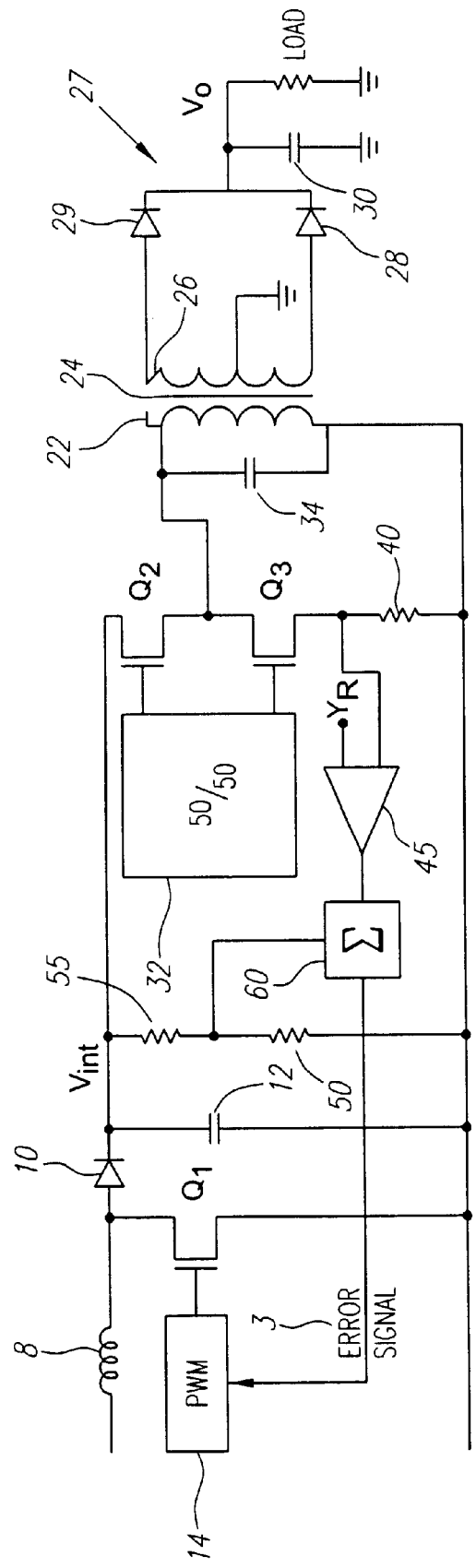
FIG. 5A is a schematic diagram of an alternate embodiment of the resonant power supply of FIG. 5, comprising a primary-side resonant capacitor in parallel with a primary side transformer.
Figure 5B:
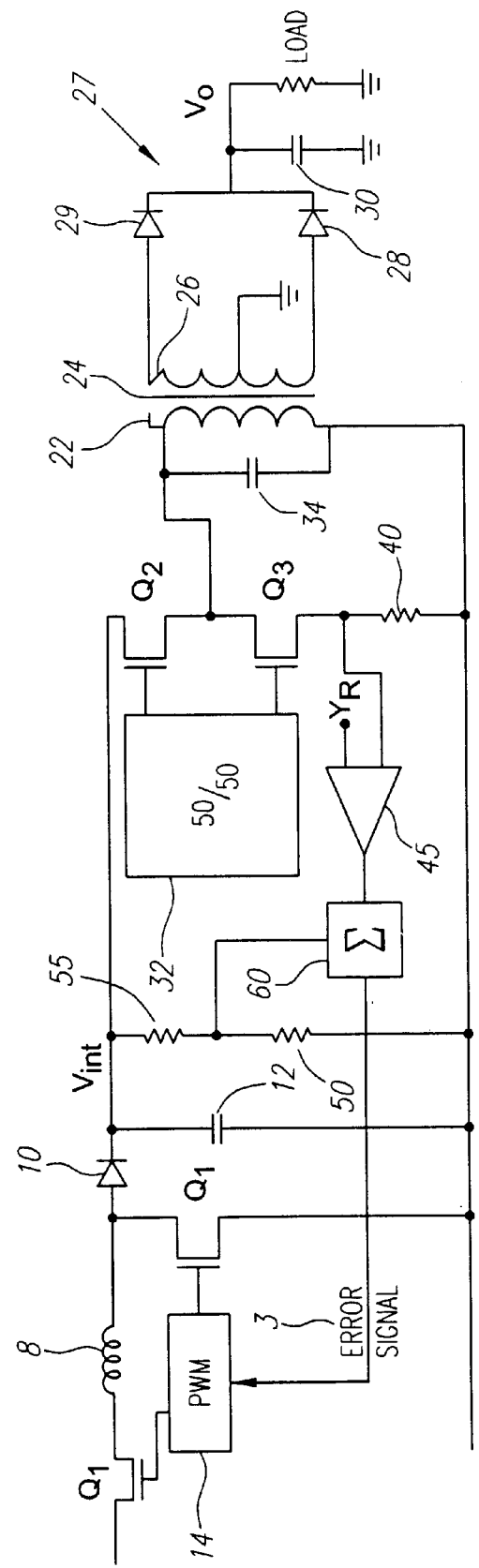
FIG. 5B is a schematic diagram of an alternate embodiment of the power supply of FIG. 5, comprising a buck input power regulator.
Figure 5C:
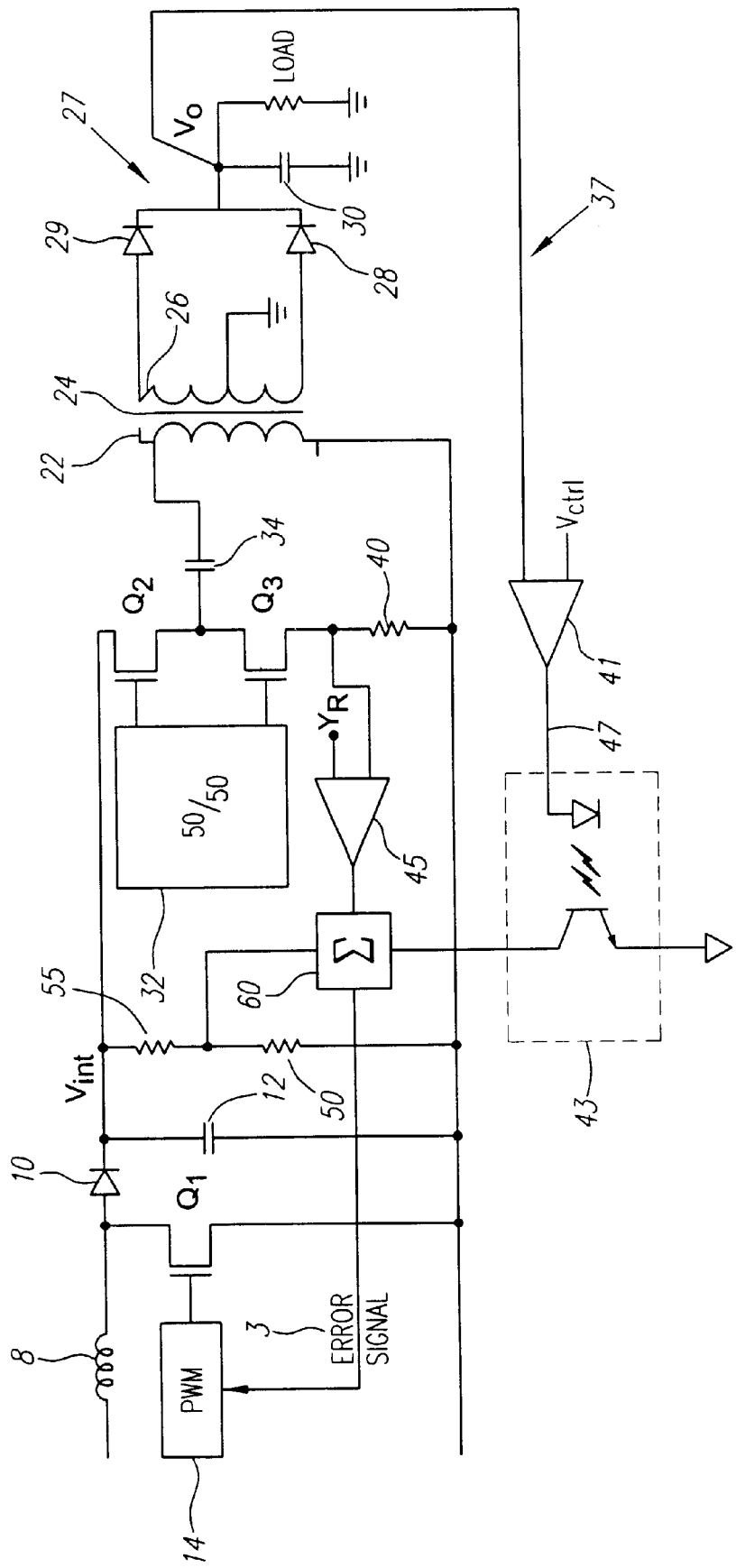
FIG. 5C is a schematic diagram of an alternate embodiment of the power supply of FIG. 5, comprising an opto-isolator feedback loop from the secondary.

As shown in FIG. 5A, the storage resonant capacitor 34 may alternately be placed in parallel with the primary winding 22. As shown in FIG. 5B, the boost power converter (i.e., inductor 8, switch $Q_1$, and diode 10), may alternately be provided as a buck converter. As shown in FIG. 5C, the power supply may additionally be provided with a feedback loop 37 from the secondary side. In particular, an error amplifier 41 compares the output voltage $V_O$ across the load with a control $V_{ctrl}$ voltage to generate a feedback control 47 signal. In a manner known in the art, (see, e.g., U.S. Pat. No. 5,313,381), the combined voltage signal from the summing circuit 60 used to control the PWM contol 14 is modulated by the feedback control signal 47 in an opto-isolator 43.

As shown in FIG. 6, a conventional $V_{cc}$ generation circuit 80 couples to the $V_{in}$ lead. Although those of ordinary skill in the art will appreciate that many configurations could be used for this circuit, $V_{cc}$ generation circuit 80 is shown comprising the zener diodes 90, the capacitors 95 and 96 and diode 100. Such a circuit provides a dependable voltage $V_{cc}$ for use in powering the components of the integrated circuit 70. Moreover, Vcc generation circuit 80 provides a convenient means to control $V_R$. It can be shown that the amount of current drawn into the $V_{cc}$ input pin will depend upon the value of the capacitor 95. The higher the value of capacitor 95, the greater the amount of current flowing in the $V_{cc}$ input pin. Sensing circuitry (not illustrated) within the integrated circuit 70 senses a voltage produced by the current through the $V_{cc}$ input pin. A voltage inverter (not illustrated) within the integrated circuit 70 inverts the sensed voltage to produce $V_R$. Thus, the value of is $V_R$ is inversely proportional to the value of capacitor 95.

$V_{cc}$ is distributed to the components needing power in the integrated circuit 70 using a conventional network (not illustrated). Note that the integrated circuit 70 includes both types of feedback inputs discussed previously, i.e., the peak resonant current $I_{peak}$ through sensing resistor 40, and the internal voltage output $V_{int}$ through the voltage divider formed by resistors 50 and 55. In alternate embodiments of the integrated circuit 70, only one of these feedback inputs could be utilized to affect the pulse width modulator 14. In addition, integrated circuit 70 could be modified to accept feedback from the external side of the transformer 24, as discussed with respect to conventional flyback power converters.

Figure 7:
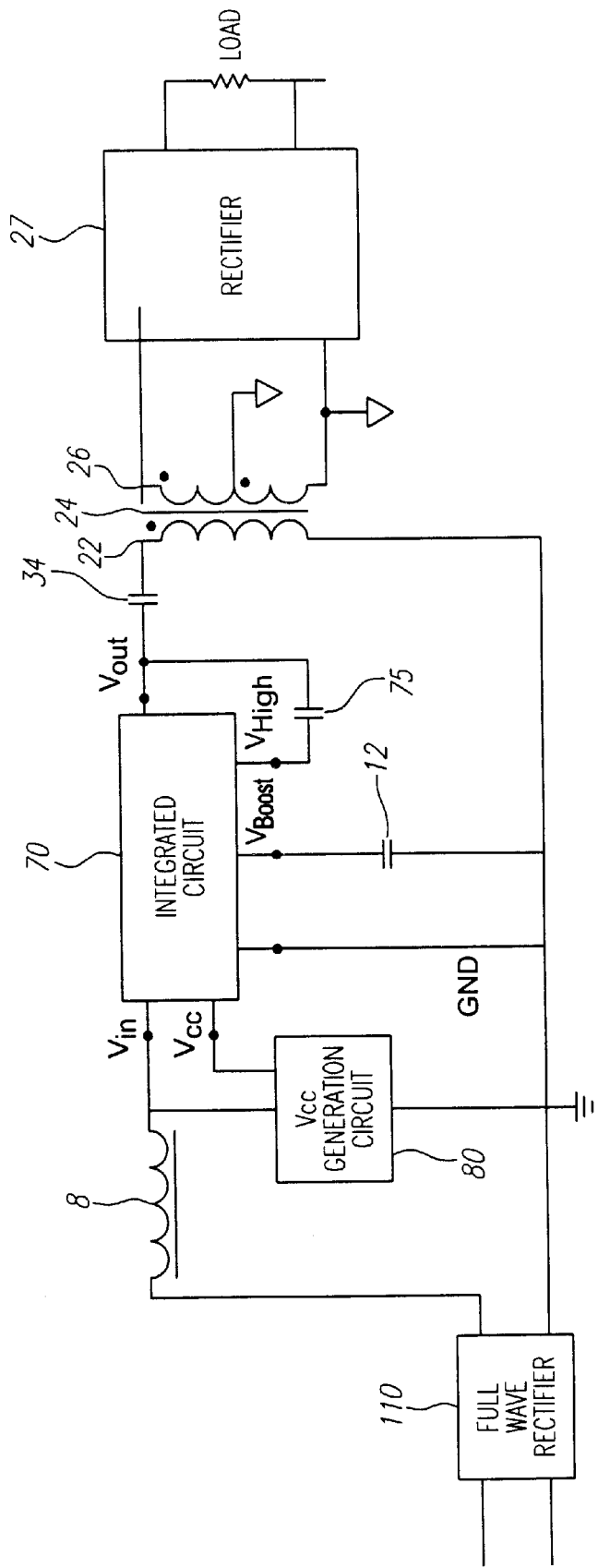
FIG. 7 is a schematic diagram illustrating the integrated circuit of FIG. 6, incorporated into an AC input power supply.

Referring now to FIG. 7, the integrated circuit 70 of FIG. 6 may be implemented to form an AC input power supply. An AC power source is coupled to a conventional full wave rectifier 110 to produce a rectified input for coupling to the boost inductor 8, which in turn couples to the Vin lead of the integrated circuit 70. The remaining leads are coupled as described with respect to FIG. 6. In addition, the rectifier 27 on the secondary side of the transformer 24 and the load are illustrated. It is to be noted that the AC input power supply of FIG. 7 may be modified to include feedback from the secondary side of the transformer 24 through the use of optoisolators or the like.

Figure 8:
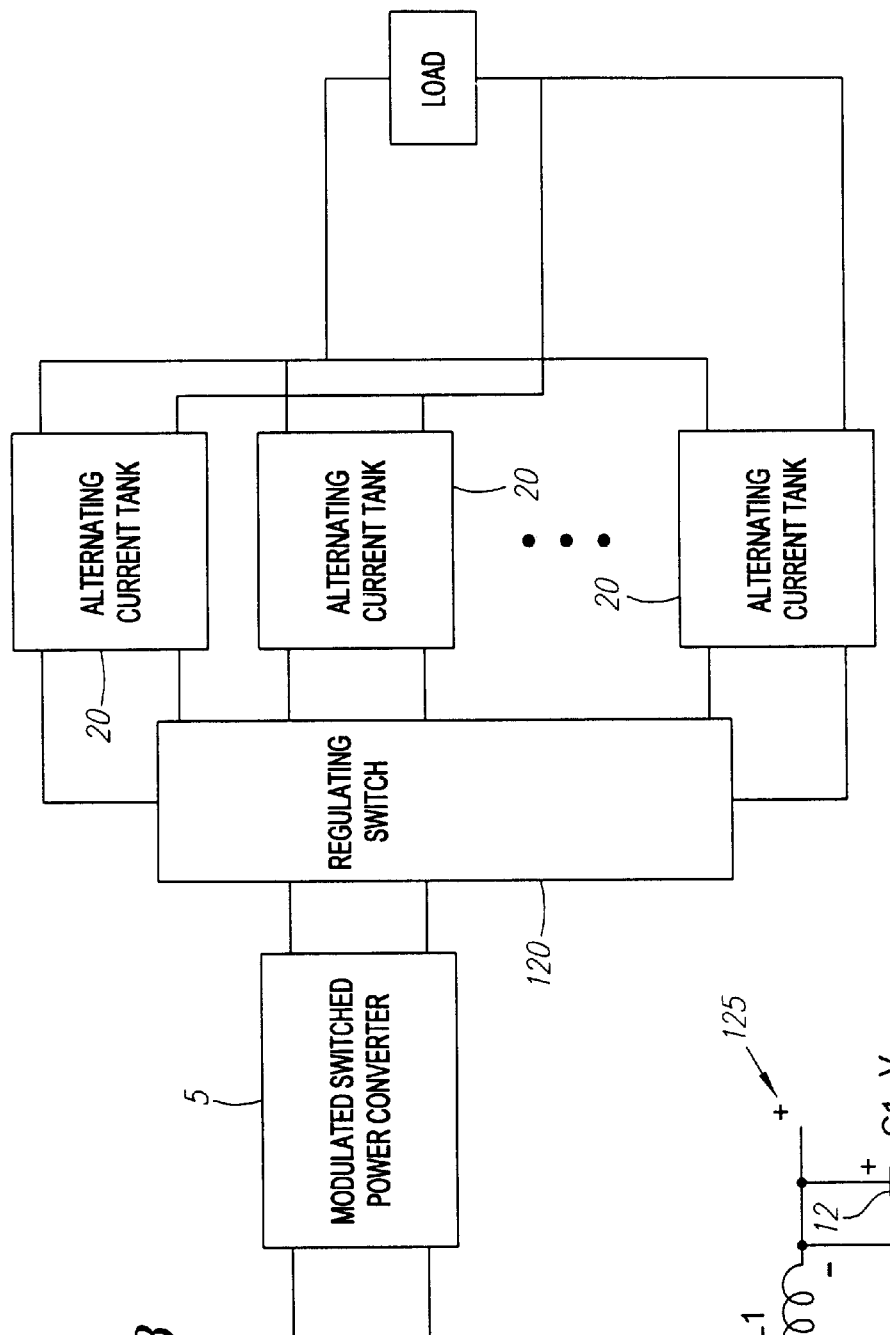
FIG. 8 is a block diagram illustrating a modulated switched power converter coupled to a plurality of alternating current tanks according to one embodiment of the invention.

The embodiments of the invention described to this point have comprised a single "front end" (the modulated switching power converter) coupled to a single "back end" (the alternating current tank). The inventor has discovered that additional power and linearity may be provided by coupling a modulated switching power converter to a plurality of alternating tanks as illustrated in FIG. 8. In this embodiment, the modulated switching power converter 5 generates an internal regulated voltage output as in the previously described embodiments. A plurality of alternating current tanks 20 are coupled in parallel to the internal regulated voltage output. This plurality of alternating current tanks 20 may be "hardwired" to the internal regulated voltage output such that each alternating current tank 20 within the plurality is always connected to the internal voltage output and constantly operating. Alternatively, an optional regulating switch 120 may couple between the plurality of alternating current tanks 20 and the modulated switching power converter 5. The regulating switch 120 couples a given alternating current tank 120 to the internal voltage output on an as-required basis. Regulating switch thus includes logic coupled to a feedback loop. The logic controls active switches, such as FETs, within the regulating switch 120 that couple a given alternating current tank to the internal voltage output. The voltage output from each of the alternating current tanks 20 within the plurality may be rectified or used as an AC output before being coupled in parallel to the load. A clock (not illustrated) may couple to each of the alternating current tanks 20 to permit the switches within the alternating current tank to operate synchronously with each other. As discussed herein, the modulated switching power converter may be of any type known in the art, for example, a boost or a buck converter. The plurality of alternating current tanks may have their storage capacitor either in series or in parallel with the primary winding of their respective transformers. As discussed herein, the modulated switching power converter may be of any type known in the art, for example, a boost or a buck converter. The plurality of alternating current tanks may have their storage capacitor either in series or in parallel with the primary winding of their respective transformers.

Regardless of whether a single alternating current tank or a plurality of alternating current tanks are used, the "front end" of th e power converter may be a buck power supply.

Figure 9:
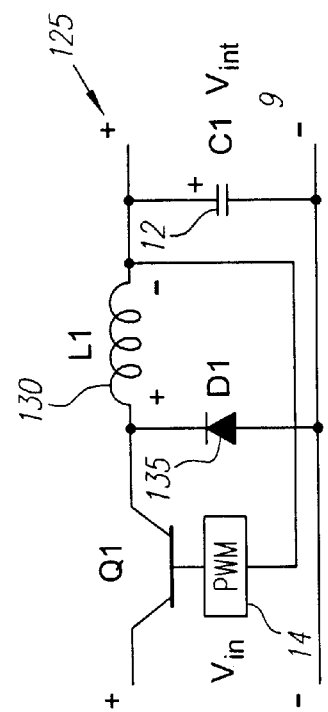
FIG. 9 illustrates a prior art PWM buck power converter.

Turning now to FIG. 9, a buck power converter 125 is illustrated. The buck converter 125 comprises a power switch Q1 (typically a field effect transistor (FET)) coupled to a buck inductor 130, a buck diode 135, and a storage capacitor 12. A pulse width modulator 14 adjusts a duty cycle of the power switch Q1 in response to sensing an internal output voltage, $V_{int}$. The relationship between the input voltage, $V_{in}$, and $V_{int}$ may be approximated as $$V_{int}=V_{in}*(t_{on}/T)$$

where T is the switching period and $t_{on}$ is the ON time of the power switch Q1. Inspection of FIG. 9 reveals that, just as with the boost power converter of FIG. 2, the ground of $V_{int}$ is not isolated from that of $V_{in}$.

Figure 10:
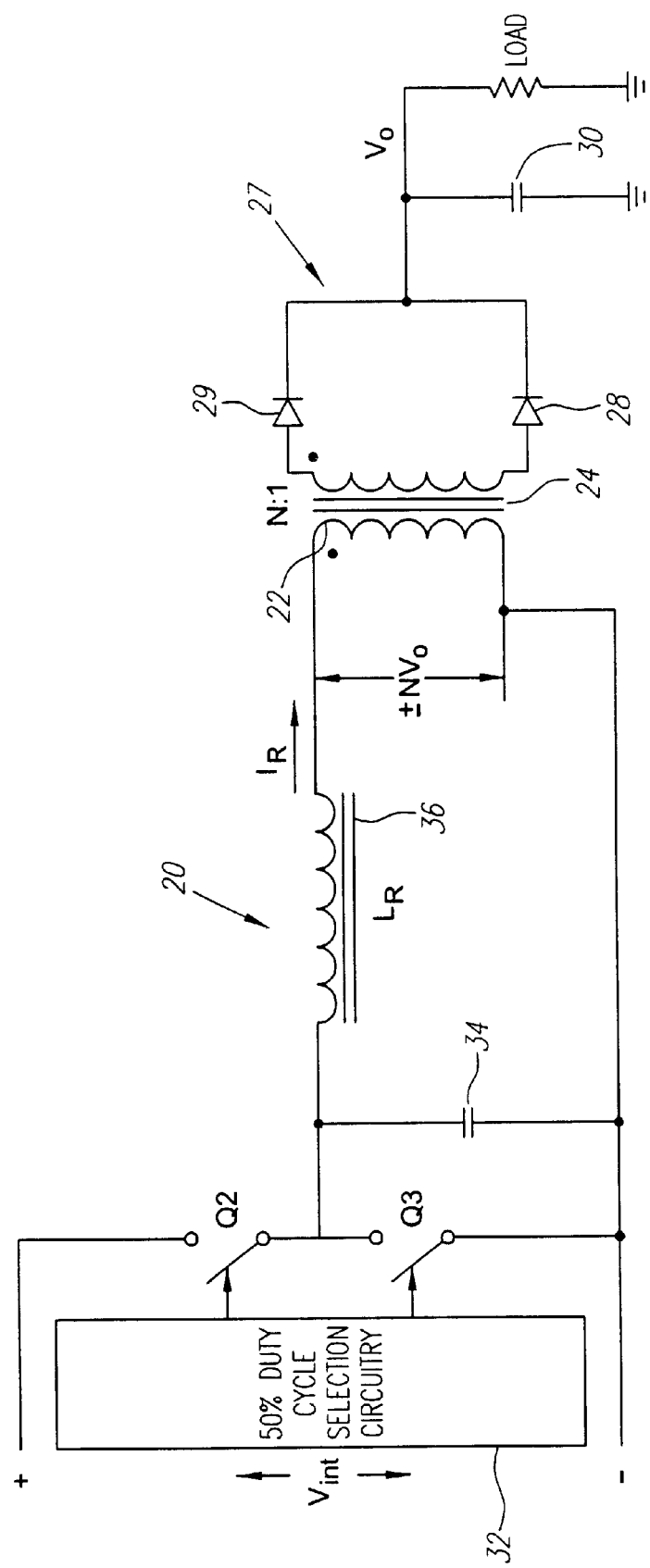
FIG. 10 is a schematic diagram of an alternating current tank in a parallel resonant tank configuration according to one embodiment of the invention.

Just as the "front end" may be either a boost or a buck converter, the "back end" alternating current tank may have its storage capacitor either in series or in parallel with the primary winding of its transformer. Turning now to FIG. 10, an alternating current tank 20 is illustrated in which storage capacitor 34 is in parallel with the primary winding 22. The remainder of the alternating current tank 20 is as described with respect to FIG. 3. The inventor has discovered that in such a configuration, it is p referable that a parallel resonant tank circuit be formed between the storage capacitor 34 and the leakage inductance 36 of the primary winding 22. As is known from the duality of parallel vs. series resonant tanks, rather than exciting a quasi-sinusoidal current through the primary winding as discussed with respect to FIG. 4, the alternating current tank of FIG. 10 has a quasi-sinusoidal voltage excited through the primary. An alternating current, is, of course, still present in the primary winding 22. However, the alternating current has a square waveform instead of a quasi-sinusoidal waveform. As illustrated, a rectifier 27 coupled to the secondary winding 26 is used to rectify the current through the load. If desired, however, the rectifier could be omitted, resulting in an alternating current flowing through the load. It is to be noted that, in certain high power applications, the leakage inductance of the transformer may be too small for efficient resonant performance. In such circumstances, an additional inductor (not illustrated) arranged in parallel with the storage capacitor 34 might be required for efficient resonant performance.

Specific examples of the present invention have been shown by way of example in the drawings and are herein described in detail. It is to be understood, however, that the invention is not to be limited to the particular forms or methods disclosed, but to the contrary, the invention is to broadly cover all modifications, equivalents, and alternatives encompassed by the scope of the appended claims.

I claim:

1. A power converter, comprising:
    a pulse width modulated switching power converter having a power switch for regulating an internal voltage output; and
    an alternating current tank coupled to the internal voltage output, the alternating current tank having a storage capacitor and a transformer having a primary winding, a first switch that, when ON, couples the storage capacitor to the internal voltage output wherein the storage capacitor is charged and a first current flows in a first direction through the primary winding, a second switch that, when ON, permits the charged storage capacitor to discharge, wherein a second current flows in a second direction opposite to the first direction through the primary winding, and duty cycle control circuitry for alternately switching ON and OFF the first and second switches, the first switch being ON when the second switch is OFF and the second switch being ON when the first switch is OFF, the duty cycle control circuitry alternately switching the first and second switches at a constant duty cycle and such that the ON and OFF times of each switch are substantially equal, whereby a voltage produced across a secondary winding of the transformer is regulated by modulating the power switch.

2. The power converter of claim 1, wherein the modulated switching power converter is a pulse width modulated boost power converter.

3. The power converter of claim 2, wherein the storage capacitor is in series with the primary winding.

4. The power converter of claim 3, wherein the storage capacitor is a resonant capacitor, the resonant capacitor and a leakage inductance of the primary winding forming a series resonant tank having a resonant frequency less than or equal to a period of the duty cycle control circuitry, whereby the first and second currents are each half-wave quasi-sinusoidal currents.

5. The power converter of claim 4, wherein the voltage across the secondary winding is regulated by adjusting the pulse width modulation of the power switch in response to sensing a peak of the first and second currents.

6. The power converter of claim 5, wherein the voltage across the secondary winding is further regulated by adjusting the pulse width modulation of the power switch in response to sensing the internal voltage output.

7. The power converter of claim 6, wherein the voltage across the secondary winding is further regulated by adjusting the pulse width modulation of the power switch in response to sensing the voltage across the secondary winding through an isolator.

8. The power converter of claim 7, wherein the isolator is an optoisolator.

9. The power converter of claim 2, wherein the storage capacitor is a resonant capacitor in parallel with the primary winding, the resonant capacitor and a leakage inductance of the primary winding forming a parallel resonant tank having a resonant frequency less than or equal to a period of the duty cycle control circuitry, whereby when the first switch is ON, a first half-wave quasi-sinusoidal voltage is impressed across the primary winding, and when the second switch is ON, a second half-wave quasi-sinusoidal voltage is impressed across the primary winding, the second half-wave quasi-sinusoidal voltage being antipodal to the first half-wave quasi-sinusoidal voltage.

10. The power converter of claim 9, wherein the voltage across the secondary winding is regulated by adjusting the pulse width modulation of the power switch in response to sensing the first and second currents.

11. The power converter of claim 1, wherein the voltage across the secondary winding is further regulated by adjusting the pulse width modulation of the power switch in response to sensing the internal voltage output.

12. The power converter of claim 11, wherein the voltage across the secondary winding is further regulated by adjusting the pulse width modulation of the power switch in response to sensing the voltage across the secondary winding through an isolator.

13. The power converter of claim 12, wherein the isolator is an optoisolator.

14. The power converter of claim 1, wherein the pulse width modulated switching power converter is a buck power converter.

15. The power converter of claim 14, wherein the storage capacitor is in series wit h the primary winding.

16. The power converter of claim 15, wherein the storage capacitor is a resonant capacitor, the resonant capacitor and a leakage inductance of the primary winding forming a series resonant tank having a resonant frequency less than or equal to a period of the duty cycle control circuitry, whereby the first and second currents are each half-wave quasi-sinusoidal currents.

17. The power converter of claim 16, wherein the voltage across the secondary winding is regulated by adjusting the pulse width modulation of the power switch in response to sensing a peak of the first and second currents.

18. The power converter of claim 17, wherein the voltage across the secondary winding is further regulated by adjusting the pulse width modulation of the power switch in response to sensing the internal voltage output.

19. The power converter of claim 18, wherein the voltage across the secondary winding is further regulated by adjusting the pulse width modulation of the power switch in response to sensing the voltage across the secondary winding through an isolator.

20. The power converter of claim 19 wherein the isolator is an optoisolator.

21. The power converter of claim 14, wherein the storage capacitor is a resonant capacitor in parallel with the primary winding, the resonant capacitor and a leakage inductance of the primary winding forming a parallel resonant tank having a resonant frequency less than or equal to a period of the duty cycle control circuitry, whereby when the first switch is ON, a first half-wave quasi-sinusoidal voltage is impressed across the primary winding, and when the second switch is ON, a second half-wave quasi-sinusoidal voltage is impressed across the primary winding, the second half-wave quasi-sinusoidal voltage being antipodal to the first half-wave quasi-sinusoidal voltage.

22. The power converter of claim 21, wherein the voltage across the secondary winding is regulated by adjusting the pulse width modulation of the power switch in response to sensing the first and second currents.

23. The power converter of claim 22, wherein the voltage across the secondary winding is further regulated by adjusting the pulse width modulation of the power switch in response to sensing the internal voltage output.

24. The power converter of claim 23, wherein the voltage across the secondary winding is further regulated by adjusting the pulse width modulation of the power switch in response to sensing the voltage across the secondary winding through an isolator.

25. The power converter of claim 24, wherein the isolator is an optoisolator.

26. A circuit for use in a power supply, comprising:
   a power switch coupled to a voltage input;
   a pulse width modulator for controlling a duty cycle of the power switch;
   a diode having its anode coupled to the voltage input;
   a first switch coupled to the cathode of the diode and to a voltage output;
   a second switch coupled to the voltage output; and
   control circuitry for alternately switching ON and OFF the first and second switches, the first switch being ON when the second switch is OFF and vice versa, the control circuitry alternately switching the first and second switches at a constant duty cycle, and such that the ON and OFF times of each switch are substantially equal, whereby a voltage produced across a secondary winding of the transformer is regulated by modulating the power switch.

27. The circuit of claim 26, wherein the power switch, the diode, the pulse width modulator, the first switch, the second switch and the control circuitry are integrated on the circuit.

28. A power converter, comprising:
a pulse width modulated switching power converter having a power switch for regulating an internal voltage output;
a plurality of alternating current tanks coupled to the internal voltage output, each alternating current tank in the plurality of alternating current tanks having a storage capacitor and a transformer having a primary winding, a first switch that, when ON, couples the storage capacitor to the internal voltage output wherein the storage capacitor is charged and a first current flows in a first direction through the primary winding, a second switch that, when ON, permits the charged storage capacitor to discharge, wherein a second current flows in a second direction opposite to the first direction through the primary winding, and duty cycle control circuitry for alternately switching ON and OFF the first and second switches, the first switch being ON when the second switch is OFF and the second switch being ON when the first switch is OFF, the duty cycle control circuitry alternately switching the first and second switches at a constant duty cycle, and such that the ON and OFF times of each switch are substantially equal, whereby, whereby a voltage produced across a secondary winding of the transformer is regulated by modulating the power switch; and
a clock coupled to the plurality of the alternating current tanks, wherein the first switches are switched synchronously with each other and the second switches are switched synchronously with each other.

29. The power converter of claim 28, wherein the modulated switching power converter is a boost power converter.

30. The power converter of claim 29, wherein within each of the alternating current tanks, the storage capacitor is in series with the primary winding.

31. The power converter of claim 30, wherein within each of the alternating current tanks, the storage capacitor is a resonant capacitor, the resonant capacitor and a leakage inductance of the primary winding forming a series resonant tank having a resonant frequency less than or equal to a period of the 50% duty cycle control circuitry, whereby the first and second currents are each half-wave quasi-sinusoidal currents.

32. The power converter of claim 29, wherein within each of the alternating current tanks, the storage capacitor is a resonant capacitor in parallel with the primary winding, the resonant capacitor and a leakage inductance of the primary winding forming a parallel resonant tank having a resonant frequency less than or equal to a period of the 50% duty cycle control circuitry, whereby when the first switch is ON, a first half-wave quasi-sinusoidal voltage is impressed across the primary winding, and when the second switch is ON, a second half-wave quasi-sinusoidal voltage is impressed across the primary winding, the second half-wave quasi-sinusoidal voltage being antipodal to the first half-wave quasi-sinusoidal voltage.

33. The power converter of claim 28, wherein the modulated switching power converter is a pulse width modulated buck power converter.

34. The power converter of claim 33, wherein within each of the alternating current tanks, the storage capacitor is in series with the primary winding.

35. The power converter of claim 34, wherein within each of the alternating current tanks, the storage capacitor is a resonant capacitor, the resonant capacitor and a leakage inductance of the primary winding forming a series resonant tank having a resonant frequency less than or equal to a period of the 50% duty cycle control circuitry, whereby the first and second currents are each half-wave quasi-sinusoidal currents.

36. The power converter of claim 33, wherein within each of the alternating current tanks, the storage capacitor is a resonant capacitor in parallel with the primary winding, the resonant capacitor and a leakage inductance of the primary winding forming a parallel resonant tank having a resonant frequency less than or equal to a period of the 50% duty cycle control circuitry, whereby when the first switch is ON, a first half-wave quasi-sinusoidal voltage is impressed across the primary winding, and when the second switch is ON, a second half-wave quasi-sinusoidal voltage is impressed across the primary winding, the second half-wave quasi-sinusoidal voltage being antipodal to the first half-wave quasi-sinusoidal voltage.

37. A power converter, comprising:
a first circuit stage including a modulated switching power converter having a power switch for regulating an internal voltage output; and
a second circuit stage including an alternating current tank coupled to the internal voltage output, the alternating current tank having a storage capacitor and a transformer having a primary winding, a first switch that, when ON, couples the storage capacitor to the internal voltage output wherein the storage capacitor is charged and a first current flows in a first direction through the primary winding, a second switch that, when ON, permits the charged storage capacitor to discharge, wherein a second current flows in a second direction opposite to the first direction through the primary winding, and duty cycle control circuitry for alternately switching ON and OFF the first and second switches, the first switch being ON when the second switch is OFF and the second switch being ON when the first switch is OFF, the duty cycle control circuitry alternately switching the first and second switches it a constant duty cycle, and such that the ON and OFF times of each switch are substantially equal, whereby a voltage produced across a secondary winding of the transformer is regulated by modulating the power switch.

38. A circuit for use in a power supply, comprising
a first circuitry stage including:
a power switch coupled to a voltage input;
a pulse width modulator for controlling a duty cycle of the power switch;
a diode having its anode coupled to the voltage input; and
a second circuitry stage coupled to the first circuitry stage, said second circuitry stage including:
a first switch coupled to the cathode of the diode and to a voltage output;
a second switch coupled to the voltage output; and
control circuitry for alternately switching ON and OFF the first and second switches, the first switch being ON when the second switch is OFF and vice versa, the control circuitry alternately switching the first and second switches at a constant duty cycle, and such that the ON and OFF times of each switch are substantially equal, whereby a voltage produced across a secondary winding of the transformer is regulated by modulating the power switch.

39. A power converter, comprising:

a first circuitry stage including a modulated switching power converter having a power switch for regulating an internal voltage output;

a second circuitry stage including a plurality of alternating current tanks coupled to the internal voltage output, each alternating current tank in the plurality of alternating current tanks having a storage capacitor and a transformer having a primary winding, a first switch that, when ON, couples the storage capacitor to the internal voltage output wherein the storage capacitor is charged and a first current flows in a first direction through the primary winding, a second switch that, when ON, permits the charged storage capacitor to discharge, wherein a second current flows in a second direction opposite to the first direction through the primary winding, and duty cycle control circuitry for alternately switching ON and OFF the first and second switches, the first switch being ON when the second switch is OFF and the second switch being ON when the first switch is OFF, the duty cycle control circuitry alternately switching the first and second switches at a constant duty cycle, and such that the ON and OFF times of each switch are substantially equal, whereby a voltage produced across a secondary winding of the transformer is regulated by modulating the power switch; and a clock circuit coupled to the plurality of the alternating current tanks, wherein the first switches are switched synchronously with each other and the second switches are switched synchronously with each other.

40. A dual stage power converter, comprising:

a first stage modulated switching power converter having a regulated output; and a second stage alternating current tank coupled to said output of said first stage, said second stage having a first switch and second switch that are actuated by alternately switching ON and OFF the first and second switches, the first switch being ON at approximately the same time the second switch is OFF and vice versa, and said first and second switches being actuated at a constant duty cycle.

* * * * *